United States Patent [19]

Eklund

[11] Patent Number: 4,980,697

[45] Date of Patent: Dec. 25, 1990

[54] PARABOLOIDAL AERIAL MOUNTING

[76] Inventor: Tore Eklund, Larstorpsvägen 13, S-591 70 Motala, Sweden

[21] Appl. No.: 346,941

[22] PCT Filed: Oct. 16, 1987

[86] PCT No.: PCT/SE87/00475

§ 371 Date: Apr. 13, 1989

§ 102(e) Date: Apr. 13, 1989

[87] PCT Pub. No.: WO88/02932

PCT Pub. Date: Apr. 21, 1988

[30] Foreign Application Priority Data

Oct. 16, 1986 [SE] Sweden ............................... 8604401

[51] Int. Cl.[5] ..................... H01Q 3/020; F16M 11/120

[52] U.S. Cl. ..................................... 343/882; 248/183

[58] Field of Search ............... 343/765, 766, 840, 880, 343/882, 878; 248/179, 183, 185, 186

[56] References Cited

U.S. PATENT DOCUMENTS

| | | | |
|---|---|---|---|
| 3,945,015 | 3/1976 | Gueguen | 343/765 |
| 4,126,865 | 11/1978 | Longhurst et al. | 343/766 |
| 4,232,320 | 11/1980 | Savalle, Jr. | 343/765 |
| 4,454,515 | 6/1984 | Major et al. | 343/882 |
| 4,528,569 | 7/1985 | Felter et al. | 343/840 |
| 4,644,365 | 2/1987 | Horning | 343/882 |
| 4,647,939 | 3/1987 | Kolhoff | 343/766 |
| 4,652,890 | 3/1987 | Crean | 343/882 |
| 4,672,385 | 6/1987 | Pindle | 343/882 |
| 4,819,006 | 4/1989 | Whitesides et al. | 343/880 |
| 4,819,007 | 4/1989 | Tezcan | 343/882 |

*Primary Examiner*—Rolf Hille
*Assistant Examiner*—Peter Toby Brown
*Attorney, Agent, or Firm*—Witherspoon & Hargest

[57] ABSTRACT

Adjustable parabolic aerial support, which permits stable attachment and easy positioning of parabolic aerials. It includes a frame (2), which is pivotally fastened to an axle (6). This axle (6) is a polar axis and is positionable in relation to the vertical plane. The polar axle (6) is adjustably securable to, for example, a mast through a holder (8). Furthermore, the polar axle is adjustable as to elevation. Such an adjustment is preferably made by means of a couple of stretching or rigging screws.

1 Claim, 6 Drawing Sheets

PARABOLOIDAL AERIAL MOUNTING

BACKGROUND OF THE INVENTION

1. Field of the Invention

The present invention relates to supports for parabolic aerials, and in particular to such a support that permits basic positioning of the parabolic aerial in a simple and fast way, alignment of the parabolic aerial with different transmitters of the same orbit, the alignment being preferably performed by remote control means, as well as secure maintaining of the parabolic aerial in its position even during bad weather conditions.

2. Description of Related Art

Parabolic aerials being in use today for reception of satellite signals, the reception as a rule concerning conventional TV programs, are usually fixed or alignable only with difficulty for reception of signals from alternative satellites. There are however exceptions, but then we are talking about very qualified and expensive parabolic aerial equipments for commercial use. For private households wanting to have the possibility to receive TV broadcast transmissions from different satellites, a simple and inexpensive equipment has not previously been available. For such purposes there have only been fixed parabolic aerial supports, which in addition have been difficult to align with even only one particular satellite.

With the increasing amount of satellites retransmitting different TV programs, a strong demand has occurred for a simple and reliable equipment for the reception of such programs. Part of such an equipment is a simple, inexpensive and steady aerial support, which permits not only an easy and fast basic positioning of the parabolic aerial, relative to a satellite orbit, but which also permits adjustment of the parabolic aerial for reception of signals from different satellites of this orbit. Such an alignment should therefore be feasible from the place where the TV-watching takes place.

Supports of a previous and corresponding type needed to be provided with a big base. Support rods would be attached in different places, and then attached to the parabolic aerial, in different places directly or to some holder thereof. For positioning, the adjustment of many support rods has therefore been necessary. The support rods had to be shortened or extended, or given varied recesses For natural reasons such an attachment will be steady, but could also be hard to handle and it may be difficult to find a suitable place for the mounting thereof. It is therefore desirable to be able to mount the parabolic aerial on a rod, which is a conventional aerial mounting technique and permits a raised position of the actual aerial.

Most satellites, which broadcast TV programs of common interest, are in one and the same orbit around the equator. From a place, e.g. in Sweden, this orbit is perceived as elliptical. A parabolic aerial, which should be able to follow this orbit, therefore has to be provided with such a support that enables the parabolic aerial to carry out a movement corresponding thereto.

SUMMARY OF THE INVENTION

The present invention applies to a support for parabolic aerials which is simple, cheap and steady and which at the same time readily enables basic positioning and alignment of the parabolic aerial relative to concerned satellites. The support of the invention replies to the above needs and is of the kind that is set forth in the claims. What is in particular characteristic of the invention will also be evident from these claims.

BRIEF DESCRIPTION OF THE DRAWINGS

The invention will now be described in more detail, in conjunction with the appended drawings, wherein.

DESCRIPTION OF THE PREFERRED EMBODIMENT(S)

Figure 1:
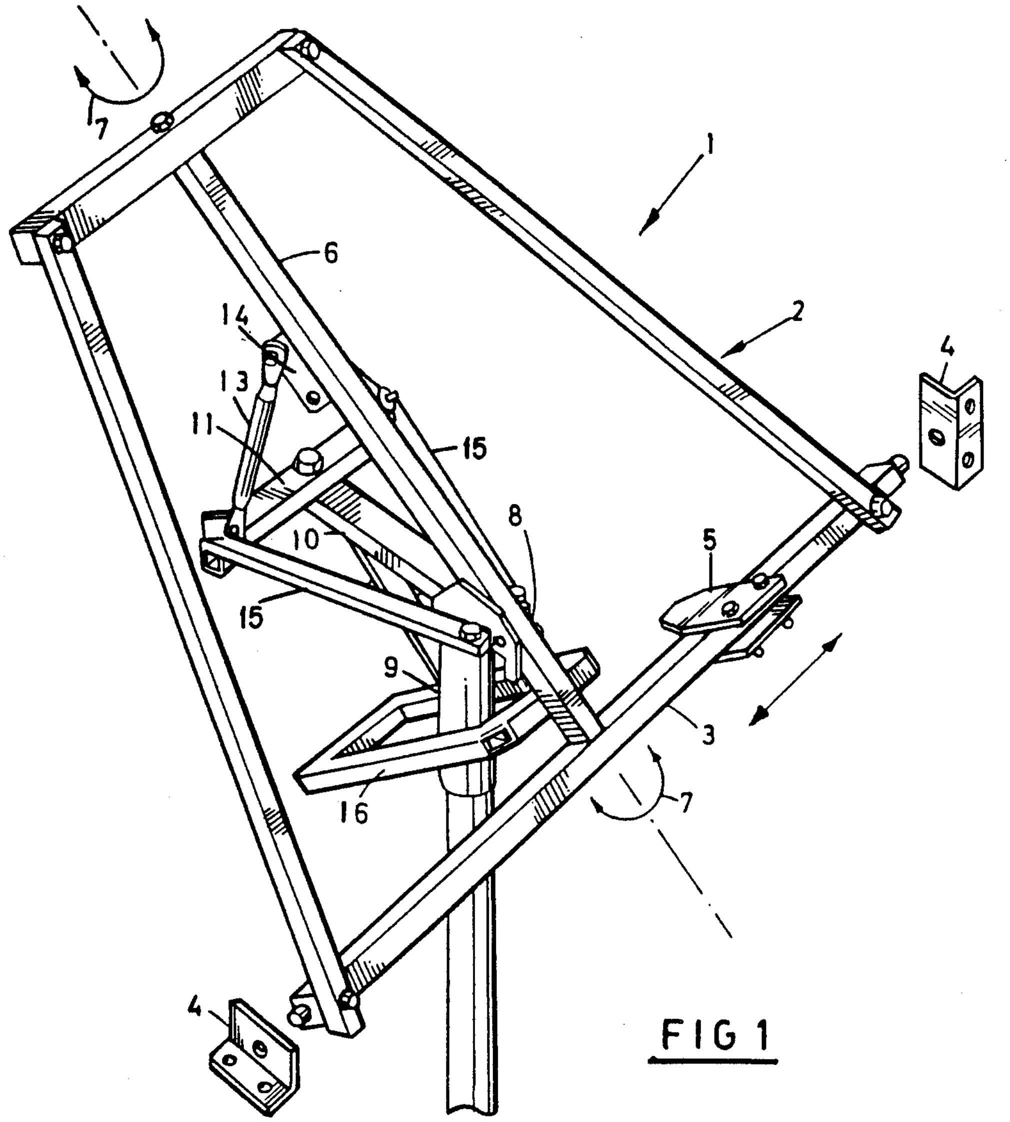
FIG. 1 is a perspective front view, i.e. the face of the parabolic aerial, of a support according to the invention.

The parabolic aerial support 1 shown in FIG. 1 comprises a frame 2 in the form of a trapezium, which in the shown embodiment consists of lengths of square tubes. These are screwed together at the outer ends. The tube 3 defined by the base includes aerial holders 4 indicated at the outer ends, and on said tube 3 there is provided a pull rod support 5 in a displaceable and lockable way. This is the frame 2 onto which the actual parabolic aerial will be fastened.

Figure 2:
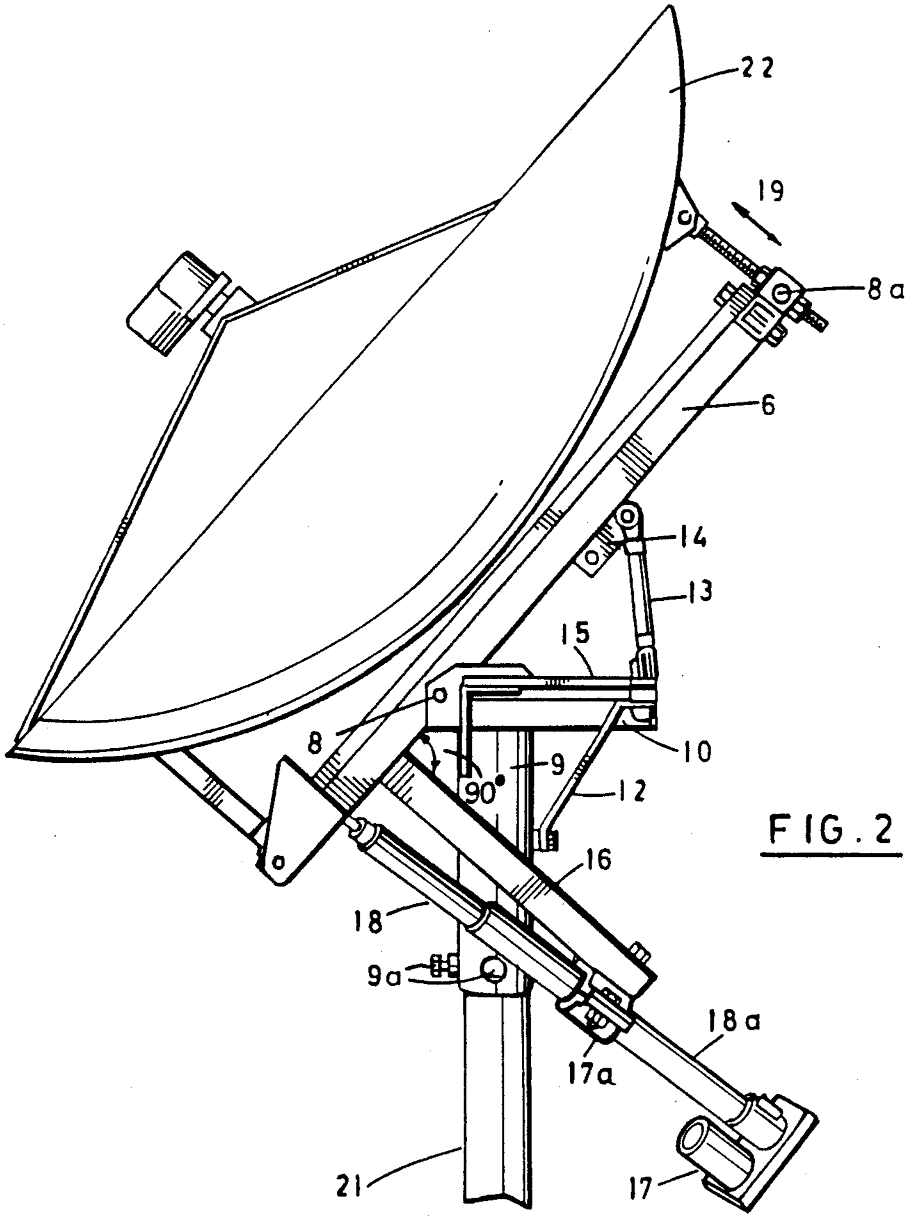
FIG. 2 is a side view of the support of FIG. 1, with a schematically drawn parabolic aerial.
Figure 3:
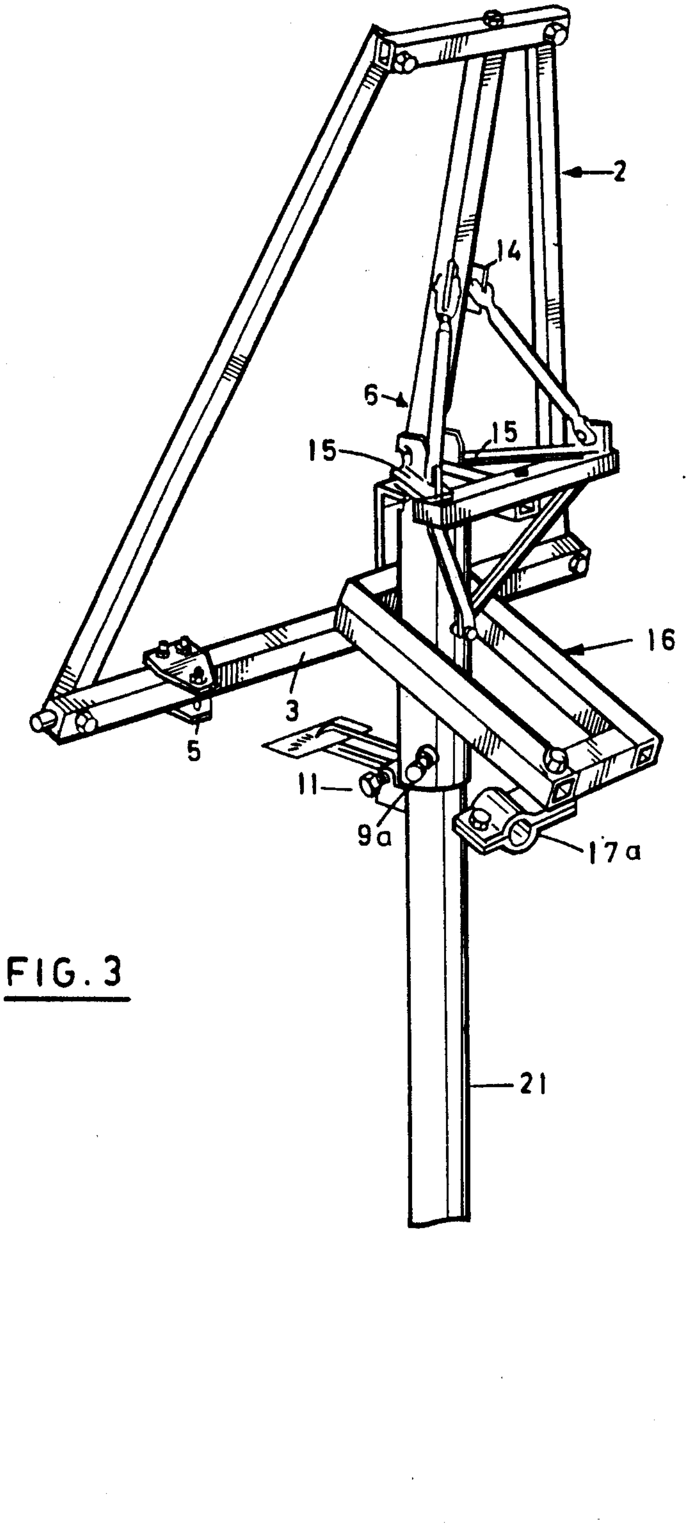
FIG. 3 is a perspective back view of the support of FIG. 1.
Figure 4:
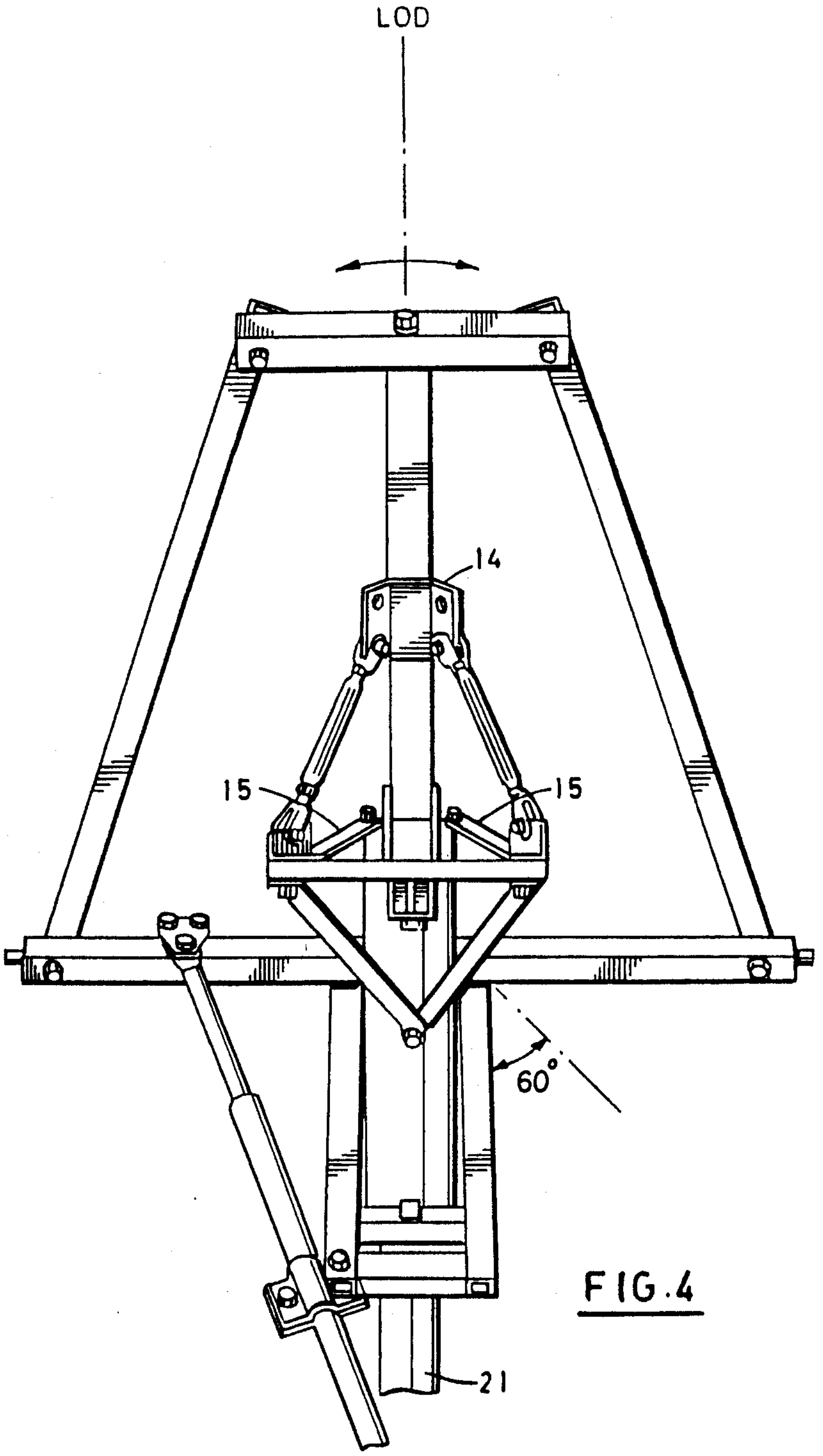
FIG. 4 is a view of the support of FIG. 1, straight from behind.
Figure 5:
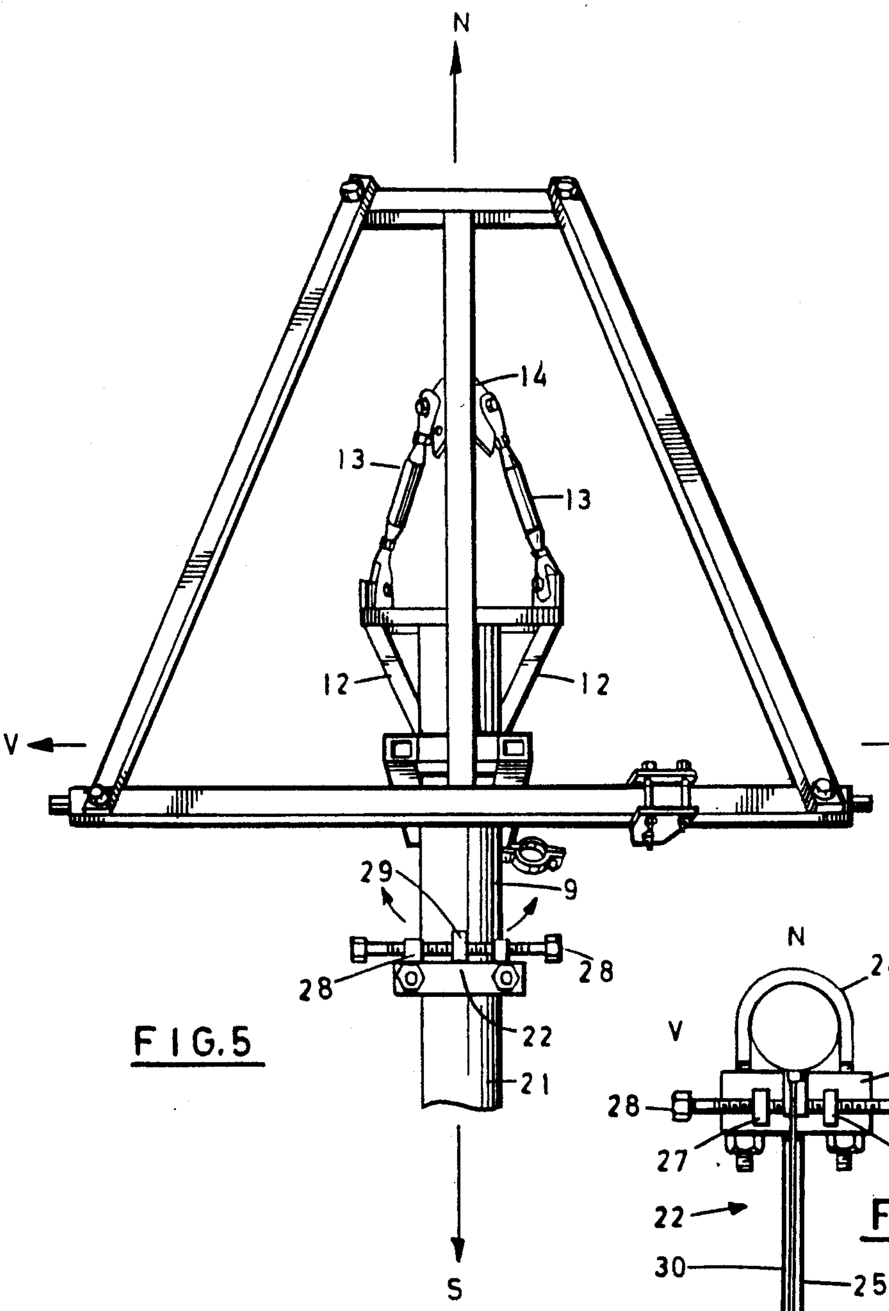
FIG. 5 is a view of the support of FIG. 1, straight from the front, provided with a mounted positioning device.

A tube 6 extends as being the height through the trapezium 2 and divides this in the middle. The tube 6, which defines a polar axis, supports the frame 2 pivotally as indicated by the arrows 7 of FIG. 1. The tube 6 is in turn pivotally fastened to a holder 8 on an attachment tube 9. The attachment is such that the tube 6 can be pivoted both back and forth and to some extent also laterally, for reasons to be explained further below. From the holder 8 on the attachment tube 9, an arm 10 extends straight backwards and at the other end thereof there is a cross member 11. From the outer ends of the cross member a couple of arms 12 extend downwards to a point on the attachment tube 9, and a couple of rigging or stretching screws 13 extend upwards to a support 14 on the tube 6. Furthermore, a couple of support rods 15 extend between the outer ends of the cross member 11 and the attachment tube 9 basically horizontally, in the assembled state of the support 1. A rectangular frame 16 is fastened to and extends perpendicularly backwards from the tube 6, as is indicated by FIG. 2, with one leg on each side of the attachment tube 9. A number of locking screws *9a* are screwed into threaded holes in the attachment tube 9.

A motor 17 is provided to drive a pull rod 18, whereby the motor 17 and pull rod 18 with associated equipment form a unit which is mounted to the frame 16. The outer end of the pull rod 18 is pivotally fastened to pull rod support 5. The pull rod sleeve *18a* is fastened to a clamp *17a* which in turn is rotatably fastened to the frame 16. Since the frame 16 is disposed perpendicularly relative to the tube 6, which constitutes the pivot axis of the frame 2, there will occur, in this construction, only one pivotal movement at the supports 5 and *17a*, which renders the bearings in these places simple and stable. Play in these bearings affects the alignment of the parabolic aerial, when it is adjusted between different satellites.

The tube 6 defines the polar axis, which means that the axis is directed to a point infinitely above the geographical north pole or earth's rotation axis, which in practice means that it should be directed to the pole star. The tube should therefore be in a vertical plane and be pivotal therein. By the screw mechanism 8a; the tilt angle, which is indicated by the arrow (19) in FIG. 2, of the parabolic aerial 22 can be adjusted relative to the plane of the frame 2, while the tube 6 is positioned by the stretching screws 13 and by their various possibilities of recess in the support 14. By turning the stretching screws 13 equally the tube 6 is pivoted, i.e. the polar axis, in the vertical plane. If further adjustment of the tube 6 is required, such adjustment can be made by turning one of the stretching screws more or less than the other as required to obtain the desired orientation. The tube 6 can thereby be positioned also in the vertical plane.

The construction of the arms 10, 12, support rods 15 and stretching screws 13 has proven to render a very rigid holding of the support 1 once positioned, in that the forces on the parabolic aerial caused for instance by storm winds are advantageously distributed in the triangular arrangements.

Figure 7:
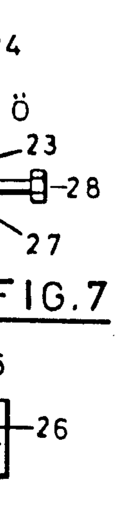
FIG. 7 is a top view of a positioning device.
Figure 6:
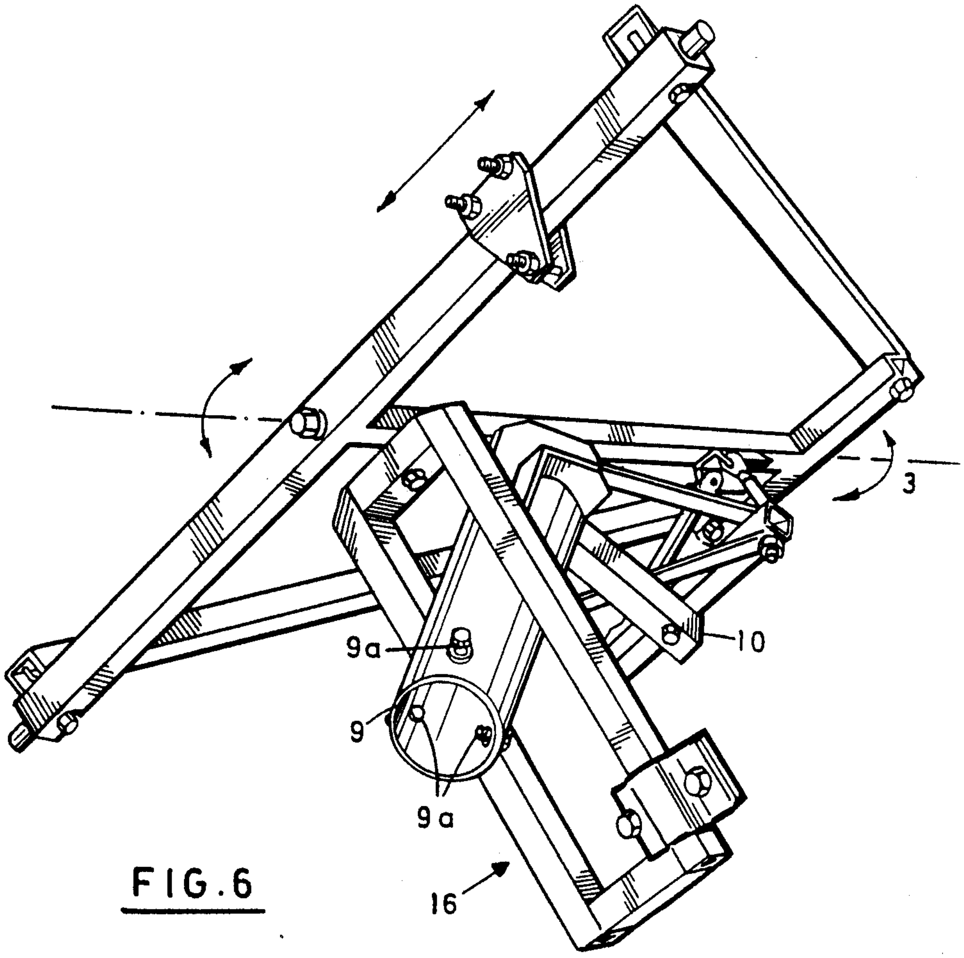
FIG. 6 is a perspective bottom view of the support of FIG. 1.

In FIG. 7 there is shown a device for facilitating the parabolic aerial positioning in straight southward direction. This device 22 consists of a block 23, which by means of a clamp 24, can be fastened around the support tube 21. From the block 23, there is a projecting arm 25, at the outer end of which there is a graduated scale 26. On one side of the block 23, there is a couple of abutments 27 provided with threaded holes, wherein a couple of screws 28 are screwed towards each other. At the lower edge of the attachment 9, there is an abutment 29 projecting radially. Above this abutment 29 there is a support for a pointer 30 interacting with the scale 26. The function of this so called south-finder will be described further below.

The basic positioning of the support according to the invention, having a parabolic aerial mounted thereon, is carried out in the following way: The attachment tube 9 is slipped onto a support tube or an equivalent rod 21, which should be as vertically disposed as possible. The parabolic aerial is directed southward provided that the aerial is located on the northern hemisphere and is intended to receive signals from satellites, e.g. above the equator. In this position, the locking screws 9a of the attachment tube 9 are tightened slightly, so that the support 1 becomes, to some extent, stable on the support tube 21. Information about angles for different satellites is available from local tables. By guidance from this information, a first positioning can be done.

First, the support 1 is positioned in the vertical plane. By suitable tightening of the locking screws 9a in the attachment tube 9 and by having a certain play between the attachment tube 9 and the support tube 21, fastening as well as positioning of the support 1 will be attained. The frame 2 is then positioned so that its plane will form an angle of 90° to the longitudinal axis of the rectangular frame 16.

To continue the positioning a satellite is used, the position of which is known. This means that the different angles pertaining to the parabolic aerial positioning have to be known. By adjusting the stretching screws 12, 13, the tube 6 is positioned in its vertical plane as well in its vertical plane inclination, both by means of known instruments and values. After loosening the screws holding the support onto the support tube 21, the satellite, the angular positions of which are known, is searched and its direction found by turning the entire support including the aerial. From instruments and/or a TV screen the positioning can be read. After having found the particular satellite, the attachment tube 9 on the support tube 21 is again tightened.

A south-finder 22, shown in FIG. 7, is clamped around the support tube 21, whereby the screws 28 are maximally screwed from each other in a position where the abutment 29 of the attachment tube will come between the screws 28. A pointer 30 is mounted in the support above the abutment 29. By turning the scale 26 in the recess 24 around the support tube 21, this can be set so that the needle 30 points at the degree, which is the angle of the particular satellite at the site in question. If there are winds acting on the parabolic aerial trying to sway it, a locking of the turning possibilities can be done by screwing home the screws 28 against the abutment 29. The clamp 24 must however first be tightened properly.

The screws 9a are then loosened as much as is needed for the attachment tube 9 to be turned around the support tube 21. If there are winds prevailing, turning can be done by screwing one of the screws in, and the other one out. When the turning has been done so that the pointer 30 is right across from 180°, the parabolic aerial is positioned straight south.

In this position the screws 9a are tightened hard, since the position is accomplished, and the south-finder can be removed if so desired.

The elevation angle of the polar axis, which is known, is adjusted by means of instruments and by rotation of the two stretching screws 12, 13. The tilt angle as well is adjusted to a known degree.

When the above is settled, the support can be driven manually or by the motor 17 so as to directionally find different satellites of known positions and of the same orbit. If needed, adjustments of the different angles may be done.

By the present invention a support is provided for parabolic aerials, which meets the above objectives. It can easily be adjusted even by an amateur, since said device can be used by many people and thus be available at the store or office of the aerial delivery person.

What is claimed is:

1. A support (1) for a parabolic aerial including an attachment device (8, 9) comprising a tubular part (9) to be thread upon the upper end of a mast (21) for mounting the support (1) to said mast (21), and a bracket (8) for holding a tube (6) which is arranged in a vertical plane and around which a frame (2) is pivotable, the frame (2) constituting the part to which the parabolic aerial (22) is to be secured, and which tube (6) is fastened to the bracket (8) so that it is adjustable to a position in which it is co-extensive with the polar axis, the adjustment of said tube (6) being carried out by operation of two rigging screws (13), the one ends of which being secured to an attachment (14) on the side of said tube opposite to the one on which the parabolic aerial is to be located and the other ends of which being secured to a cross member (11) at the outer ends thereof, the cross member (11) being secured to the outer end of an arm (10) projecting from the bracket (8) on the same side of said tube (6) as the one on which said attachment (14) is located, said other ends of the rigging screws (13) being below said one ends and at a distance from each other which is greater than the distance between said one ends.

* * * * *